(12) United States Patent
Lee

(10) Patent No.: US 12,479,041 B2
(45) Date of Patent: Nov. 25, 2025

(54) APPARATUS FOR MEASURING ALIGNMENT OF WELDING GUN

(71) Applicants: Hyundai Motor Company, Seoul (KR); Kia Corporation, Seoul (KR)

(72) Inventor: Seung Ho Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 671 days.

(21) Appl. No.: 17/953,920

(22) Filed: Sep. 27, 2022

(65) Prior Publication Data

US 2023/0219161 A1 Jul. 13, 2023

(30) Foreign Application Priority Data

Jan. 7, 2022 (KR) .................. 10-2022-0002595

(51) Int. Cl.
*B23K 11/36* (2006.01)
*B23K 11/11* (2006.01)
*B23K 11/25* (2006.01)

(52) U.S. Cl.
CPC ............ *B23K 11/36* (2013.01); *B23K 11/115* (2013.01); *B23K 11/25* (2013.01)

(58) Field of Classification Search
CPC ........ B23K 11/36; B23K 11/115; B23K 11/25
USPC .......... 219/73, 73.1, 73.2, 50, 125.1, 125.11, 219/125.12, 126, 136, 137.61, 146.41, 219/160
See application file for complete search history.

(56) References Cited

U.S. PATENT DOCUMENTS 6,297,472 B1 * 10/2001 Bong .................. B23K 9/0203
219/125.12

FOREIGN PATENT DOCUMENTS

| KR | 101278543 B1 | 6/2013 |
| KR | 10-2016-0123887 A | 10/2016 |
| KR | 101828962 B1 | 2/2018 |

* cited by examiner

*Primary Examiner* — Phuong T Nguyen
(74) *Attorney, Agent, or Firm* — Fox Rothschild LLP

(57) ABSTRACT

An apparatus for measuring alignment of a welding gun comprises a case comprising an interior space and an open side, a supporting member mounted to the interior space, an upper block comprising a first end fixed to the supporting member, formed with an upper tip insertion hole at a second end, hinge-engaged with an upper pin mounted to the case and configured to rotate when an upper tip is misaligned, an upper sensor unit mounted adjacent to the upper block to detect rotation of the upper block, a lower block having a first end fixed to the supporting member, formed with a lower tip insertion hole at a second end, hinge-engaged with a lower pin mounted to the case, and configured to rotate when a lower tip is misaligned, and a lower sensor unit mounted adjacent to the lower block configured to detect rotation of the lower block.

12 Claims, 5 Drawing Sheets

APPARATUS FOR MEASURING ALIGNMENT OF WELDING GUN

CROSS-REFERENCE TO RELATED APPLICATION(S)

This application claims, under 35 U.S.C. § 119(a), the benefit of Korean Patent Application No. 10-2022-0002595, filed in the Korean Intellectual Property Office on Jan. 7, 2022, the disclosure of which is incorporated herein by reference in its entirety.

BACKGROUND

Technical Field

Embodiments of the present disclosure relate to an apparatus for measuring alignment of a welding gun.

Description of the Related Art

In general, in spot welding, a plurality of metal plates for welding are stacked and sandwiched between a pair of upper and lower tips, and then welded by applying a current to generate resistance heat on the contact surface.

In such spot welding, the distribution of current flowing through the metal plate and the pressing force have a great influence on the quality of welding.

Specifically, it is known that the alignment of the upper and lower tips in contact with the metal plate have a great influence on the quality of welding.

Therefore, managing the alignment of the upper and lower tips in good condition is important in managing the welding in good condition.

The above information disclosed in this Background section is only for enhancement of understanding of the background of the present disclosure, and therefore it may contain information that does not form the existing technologies that are already known in this country to a person of ordinary skill in the art.

SUMMARY

An apparatus for measuring alignment of a welding gun comprises a case provided with an interior space, and comprising an open side, a supporting member mounted to the interior space, an upper block comprising a first end portion fixed to the supporting member, formed with an upper tip insertion hole at a second end portion, hinge-engaged with an upper pin mounted to opposing surfaces of the case, and configured to rotate according to an alignment state of an upper tip, an upper sensor unit mounted adjacent to the upper block and configured to detect rotation of the upper block, a lower block having a first end portion fixed to the supporting member, formed with a lower tip insertion hole at a second end portion, hinge-engaged with a lower pin mounted to opposing surfaces of the case, and configured to rotate according to an alignment state of a lower tip, and a lower sensor unit mounted adjacent to the lower block and configured to detect rotation of the lower block.

The case may be detachably attached to a gripper by a connection bracket.

The supporting member may be vertically disposed in the interior space of the case.

The supporting member may comprise a flange protruding along the upper surface of the case and fixed to an upper surface of the case.

The supporting member may penetrate a lower surface of the case and be fixed to a stand.

The upper block may comprise an upper stopper having a first end portion mounted to the supporting member, and a second end portion formed integral to the first end and protruding upward, an upper weight vertically disposed to correspond to the second end portion of the upper stopper, and an upper measurement portion having a first end portion fixed to the upper weight, formed with the upper tip insertion hole at a second end portion, having a central portion hinge-engaged with the upper pin and horizontally disposed, and exposing the upper tip insertion hole through the open side of the case.

The upper sensor unit may be positioned on a same axis with the upper weight, and mounted to the case to correspond to an upper detection portion protruding from the upper measurement portion.

In the upper block, when the upper tip is misaligned and is not inserted into the upper tip insertion hole, the upper measurement portion may be configured to rotate around the upper pin, and upper sensor unit may be configured to sense the upper detection portion.

The lower block may comprise a lower stopper having a first end portion mounted to the supporting member, and a second end portion formed integral to the first end and protruding upward, a lower weight vertically disposed to correspond to the second end portion of the lower stopper, and a lower measurement portion having a central portion connected to the lower weight and horizontally disposed, having a first end portion hinge-engaged with the lower pin, formed with the lower tip insertion hole at a second end portion, and exposing the lower tip insertion hole through the open side of the case.

The lower sensor unit may be mounted to the lower stopper to correspond to a lower detection portion protruding toward the lower stopper from the first end portion of the lower measurement portion adjacent to the lower pin.

In the lower block, when the lower tip is misaligned and is not inserted into the lower tip insertion hole, the lower measurement portion may be configured to rotate around the lower pin, and the lower sensor unit may be configured to sense the lower detection portion.

An apparatus for measuring alignment of a welding gun may further comprise a control board to which the upper sensor unit and the lower sensor unit are connected.

An apparatus for measuring alignment of a welding gun may further comprise an alarm connected to the control board and configured to output a signal for a misalignment state of the upper tip and the lower tip.

According to an apparatus for measuring alignment of a welding gun according to an exemplary embodiment, it is possible to prevent defects in the exterior quality of the finished vehicle caused by defective alignment of the welding gun.

In addition, according to an apparatus for measuring alignment of a welding gun according to an exemplary embodiment, high efficiency may be realized at low cost in comparison with compared to conventional art, thereby providing advantages in applying to vehicle body mass production factories.

In addition, according to an apparatus for measuring alignment of a welding gun according to an exemplary embodiment, simultaneous alignment inspection of the upper tip 3 and the lower tip 5 is available, thereby reducing the inspection period.

Other effects that may be obtained or are predicted by an exemplary embodiment will be explicitly or implicitly described in a detailed description of the present disclosure. That is, various effects that are predicted according to an exemplary embodiment will be described in the following detailed description.

DETAILED DESCRIPTION

Figure 1:
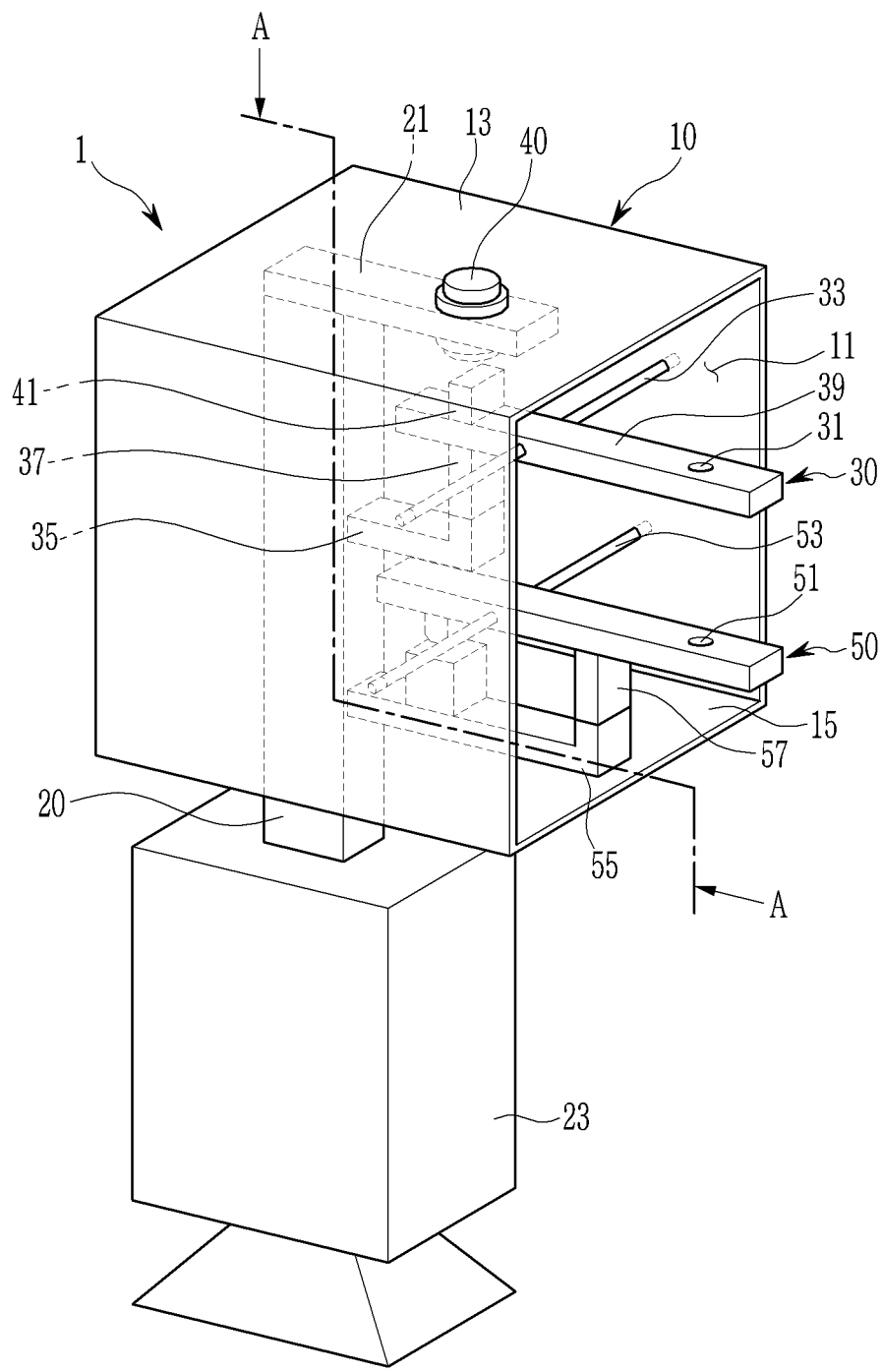
FIG. 1 is a schematic diagram of an apparatus for measuring alignment of a welding gun according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. In the drawings, the same reference numerals will be used throughout to designate the same or equivalent elements. In addition, a detailed description of well-known features or functions will be ruled out in order not to unnecessarily obscure the gist of the present disclosure.

In order to clarify the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", will be understood to imply the inclusion of stated elements but not the exclusion of any other elements.

Figure 2:
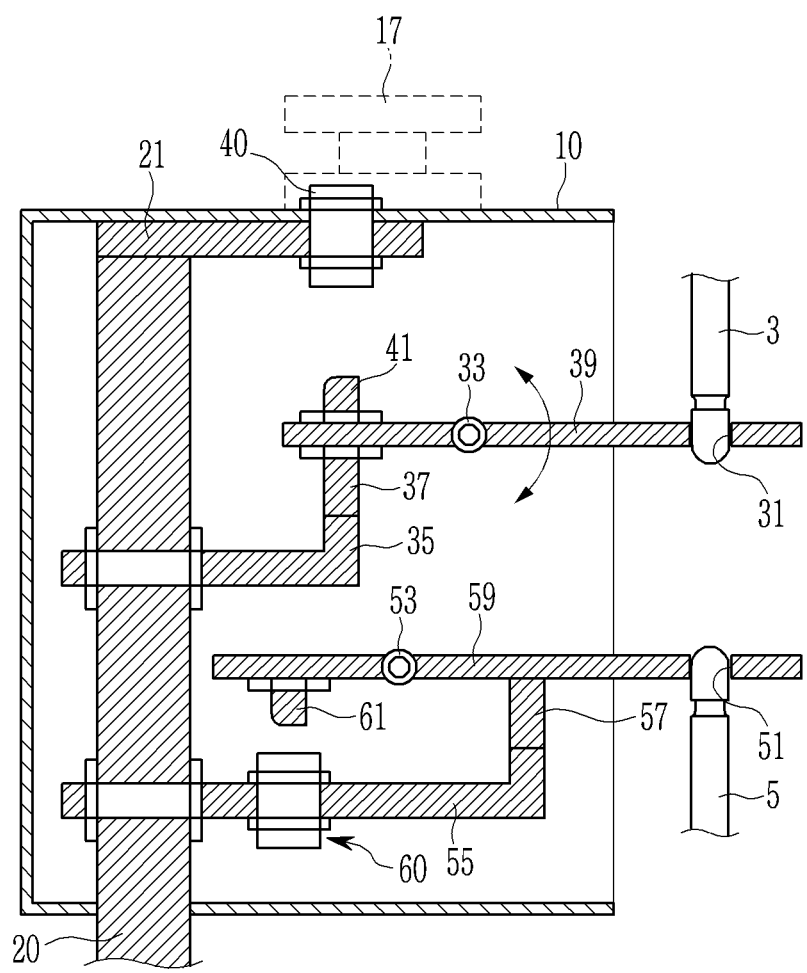
FIG. 2 is a cross-sectional view taken along line A-A of FIG. 1.

FIG. 1 is a schematic diagram of an apparatus for measuring alignment of a welding gun according to an exemplary embodiment, and FIG. 2 is a cross-sectional view taken along line A-A of FIG. 1.

Referring to FIG. 1 and FIG. 2, an apparatus 1 for measuring alignment of a welding gun according to an exemplary embodiment comprises a case 10, a supporting member 20, an upper block 30, an upper sensor unit 40, a lower block 50, and a lower sensor unit 60.

The case 10 is provided with an interior space 11, and may be formed in the form of a rectangular box.

The case 10 may have an open side.

The case 10 may be configured to prevent interior component parts of the apparatus 1 for measuring alignment of a welding gun from being damaged by inflowing welding spatters or foreign substances.

In addition, the case 10 may be configured to be detachably attached to separate gripper and the like by a connection bracket 17.

The supporting member 20 may be mounted to the interior space 11 of the case 10.

The supporting member 20 may be vertically disposed in the interior space 11 of the case 10.

The supporting member 20 may comprise a flange 21 protruding along the upper surface 13 of the case 10 and fixed to an upper surface 13 of the case 10.

The supporting member 20 may be configured to penetrate a lower surface of the case 15 and be fixed to a stand 23.

That is, the apparatus 1 for measuring alignment of a welding gun according to an exemplary embodiment may be configured to be connected to gripper and the like by mounting the connection bracket 17 to the case 10, and may be configured to be fixed to the stand 23.

The upper block 30 has a first end portion fixed to the supporting member 20, and formed with an upper tip insertion hole 31 at a second end portion.

The upper block 30 may be hinge-engaged with an upper pin 33 mounted to opposing surfaces of the case 10, and configured to rotate according to an alignment state of an upper tip 3.

The upper block 30 may comprise an upper stopper 35, an upper weight 37, and an upper measurement portion 39.

The upper stopper 35 may have a first end portion mounted to the supporting member 20, and a second end portion formed integral to the first end and protruding upward.

The upper stopper 35 may be configured to ensure that the upper block 30 returns to the original position after operation.

The upper weight 37 may be vertically disposed to correspond to the second end portion of the upper stopper 35.

The upper weight 37 may be configured to enable the upper measurement portion 39 to return to its original position by gravitation after operation.

The upper measurement portion 39 may have a first end portion fixed to the upper weight 37, and formed with the upper tip insertion hole 31 at a second end portion.

The upper measurement portion 39 may have a central portion hinge-engaged with the upper pin 33 and horizontally disposed.

The upper measurement portion 39 may be configured to expose the upper tip insertion hole 31 through the open side of the case 10.

The upper sensor unit 40 may be mounted adjacent to the upper block 30 and configured to detect rotation of the upper block 30.

The upper sensor unit 40 may be positioned on a same axis with the upper weight 37.

The upper sensor unit 40 may be mounted to the case 10 to correspond to an upper detection portion 41 protruding from the upper measurement portion 39.

For example, the upper sensor unit 40 may be a non-contact detection sensor.

In the upper block 30, when the upper tip 3 is misaligned and is not inserted into the upper tip insertion hole 31, the upper measurement portion 39 may be configured to rotate around the upper pin 33, and the upper detection portion 41 may be configured to be sensed by the upper sensor unit 40.

The lower block 50 may have a first end portion fixed to the supporting member 20, and formed with a lower tip insertion hole 51 at a second end portion.

The lower block 50 may be hinge-engaged with a lower pin 53 mounted to opposing surfaces of the case 10, and configured to rotate according to an alignment state of a lower tip 5.

The lower block 50 may comprise a lower stopper 55, a lower weight 57, and a lower measurement portion 59.

The lower stopper 55 may have a first end portion mounted to the supporting member 20, and a second end portion formed integral to the first end and protruding upward.

The lower stopper 55 may be configured to ensure that the lower block 50 returns to the original position after operation.

The lower weight 57 may be vertically disposed to correspond to the second end portion of the lower stopper 55.

The lower measurement portion 59 may have a central portion connected to the lower weight 57 and may be horizontally disposed.

The lower weight 57 may be configured to enable the lower measurement portion 59 to return to its original position by gravitation after operation.

In addition, the lower measurement portion 59 may have a first end portion hinge-engaged with the lower pin 53, and be formed with the lower tip insertion hole 51 at a second end portion.

The lower measurement portion 59 may be configured to expose the lower tip insertion hole 51 through the open side of the case 10.

The lower sensor unit 60 may be mounted adjacent to the lower block 50 and configured to detect rotation of the lower block 50.

The lower sensor unit 60 may be mounted to the lower stopper 55 to correspond to a lower detection portion 61 protruding toward the lower stopper 55 from the first end portion of the lower measurement portion 59 adjacent to the lower pin 53.

For example, the lower sensor unit 60 may be a non-contact detection sensor.

In the lower block 50, when the lower tip 5 is misaligned and is not inserted into the lower tip insertion hole 51, the lower measurement portion 59 may be configured to rotate around the lower pin 53, and the lower detection portion 61 may be configured to be sensed by the lower sensor unit 60.

A control board 70 may be configured to be connected to the upper sensor unit 40 and the lower sensor unit 60.

In addition, an alarm 80 may be configured to be connected to the control board 70, and the alarm 80 may be configured to output a signal for a misalignment state of the upper tip 3 and the lower tip 5.

Figure 3:
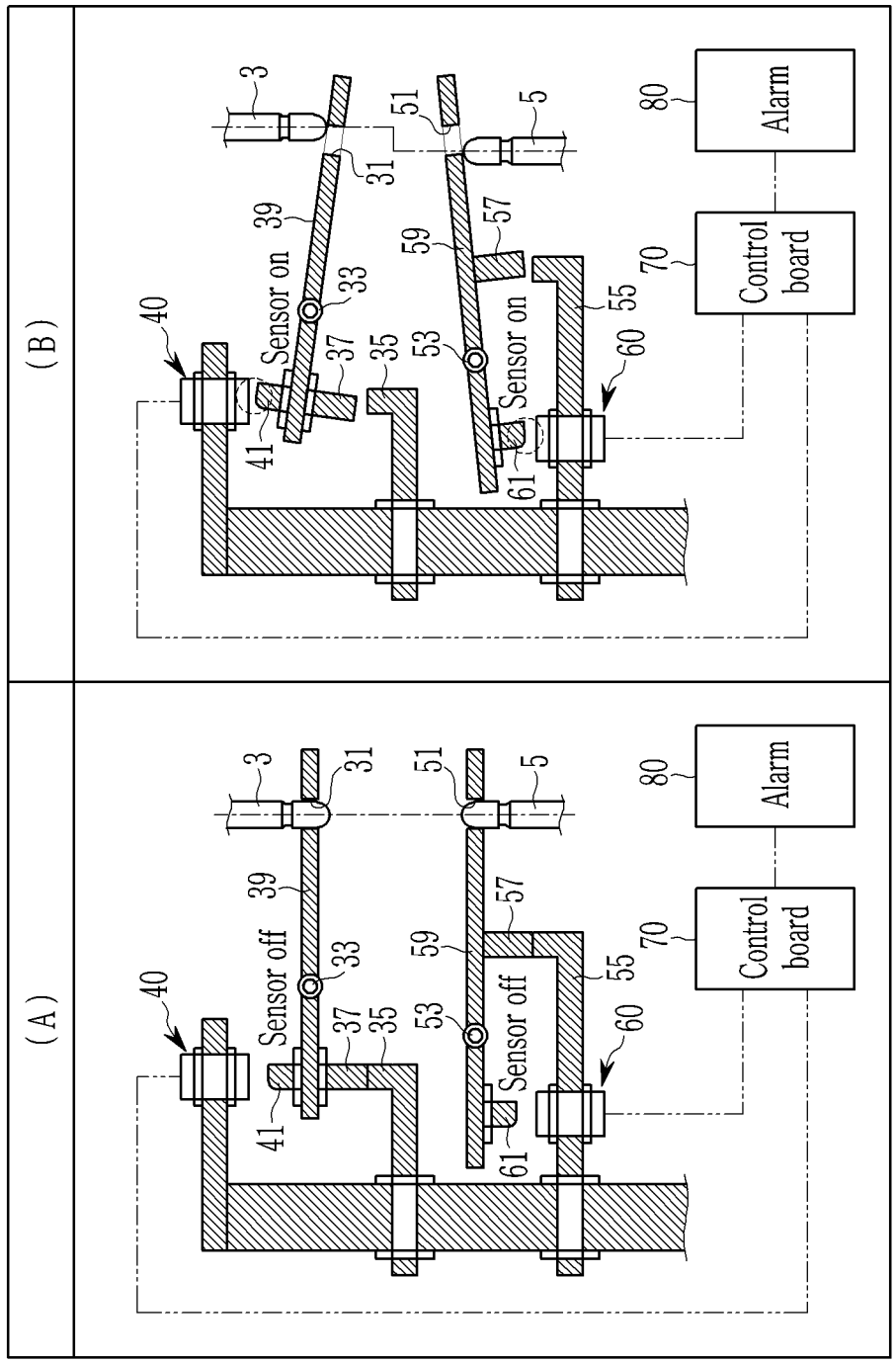
FIG. 3 is an operation diagram of an apparatus for measuring alignment of a welding gun according to an exemplary embodiment.

FIG. 3 is an operation diagram of an apparatus for measuring alignment of a welding gun according to an exemplary embodiment.

Section A of FIG. 3 illustrates that a welding gun having a normal alignment state is measured by the apparatus 1 for measuring alignment of a welding gun according to an exemplary embodiment, and section B of FIG. 3 illustrates that a welding gun having an abnormal alignment state is measured by the apparatus 1 for measuring alignment of a welding gun.

When the alignment states of the upper tip 3 and the lower tip 5 of the welding gun to be measured is a normal state, the upper sensor unit 40 and the lower sensor unit 60 do not operate, and the test is finished (refer to section A).

When the alignment states of the upper tip 3 and/or the lower tip 5 of the welding gun to be measured is an abnormal state, that is, when misaligned, the upper block 30 and/or the lower block 50 rotates, and thus the control board 70 detects the signal of the upper sensor unit 40 and/or the lower sensor unit 60 in the non-contact manner, and outputs a signal to the alarm 80.

At this time, the upper sensor unit 40 and/or the lower sensor unit 60 is configured to operate in the non-contact manner, when the upper measurement portion 39 and/or the lower measurement portion 59 comes within a sensor detection height.

In addition, in the upper measurement portion 39, with reference to the upper pin 33, the moment of the first end portion where the upper weight 37 is positioned may be formed larger than the moment of the second end portion where the upper tip insertion hole 31 is positioned.

In the same way, in the lower measurement portion 59, with reference to the lower pin 53, the moment of the first end portion where the lower weight 57 is positioned may be formed larger than the moment of the second end portion where the lower tip insertion hole 51 is positioned.

A person skilled in the art may set specific weight values of the upper weight 37 and the lower weight 57 and specific positions of the upper pin 33 and the lower pin 53 under such condition.

Figure 4:
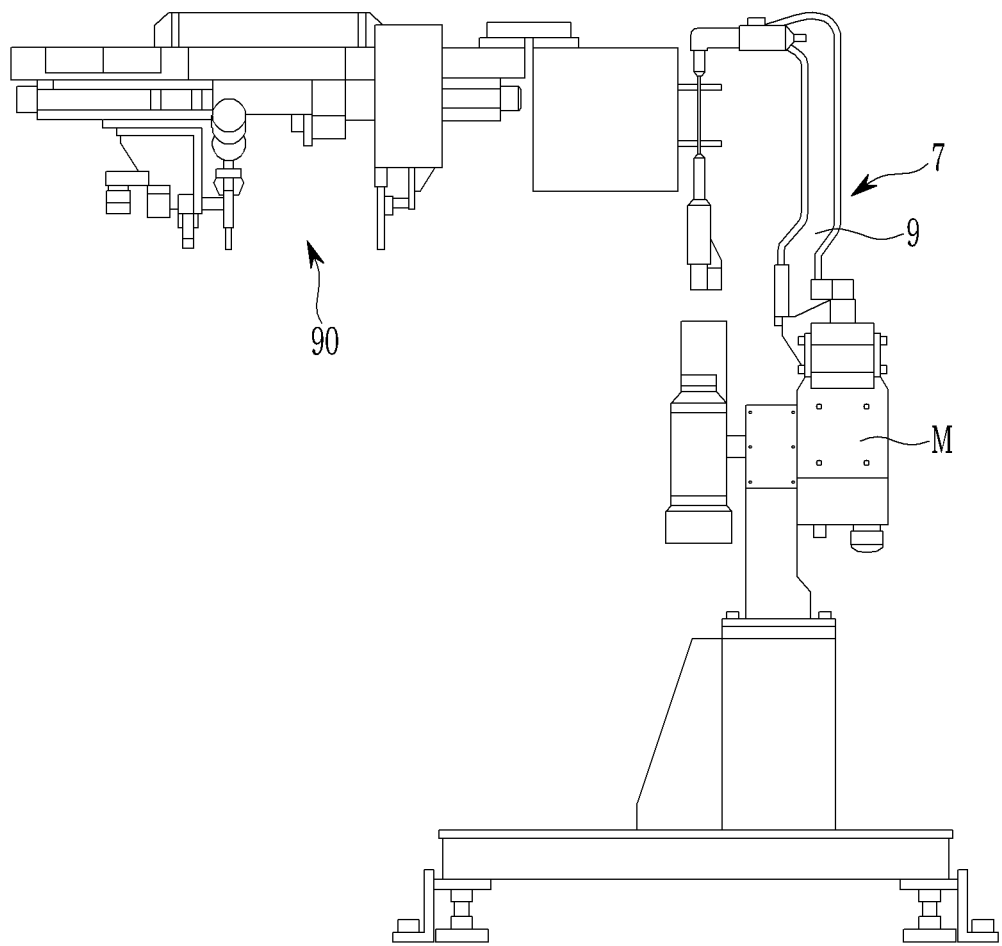
FIG. 4 is a schematic diagram of a welding apparatus to which an apparatus for measuring alignment of a welding gun according to an exemplary embodiment is applicable.

FIG. 4 is a schematic diagram of a welding apparatus to which an apparatus for measuring alignment of a welding gun according to an exemplary embodiment is applicable.

Referring to FIG. 4, the upper tip 3 and the lower tip 5 applied to an apparatus for measuring alignment of a welding gun may be mounted to a stationary welding apparatus 7.

The upper tip 3 and the lower tip 5 may be fixed to a body 9 of the stationary welding apparatus 7.

For example, the stationary welding apparatus 7 applied with the upper tip 3 and the lower tip 5 may be fixed to the ground, and the inspection of the upper tip 3 and the lower tip 5 may be performed while the apparatus 1 for measuring alignment of a welding gun mounted to a gripper 90 moves.

In the stationary welding apparatus 7, a motor M configured to operate the upper tip 3 and the lower tip 5 may be mounted to the body 9.

Figure 5:
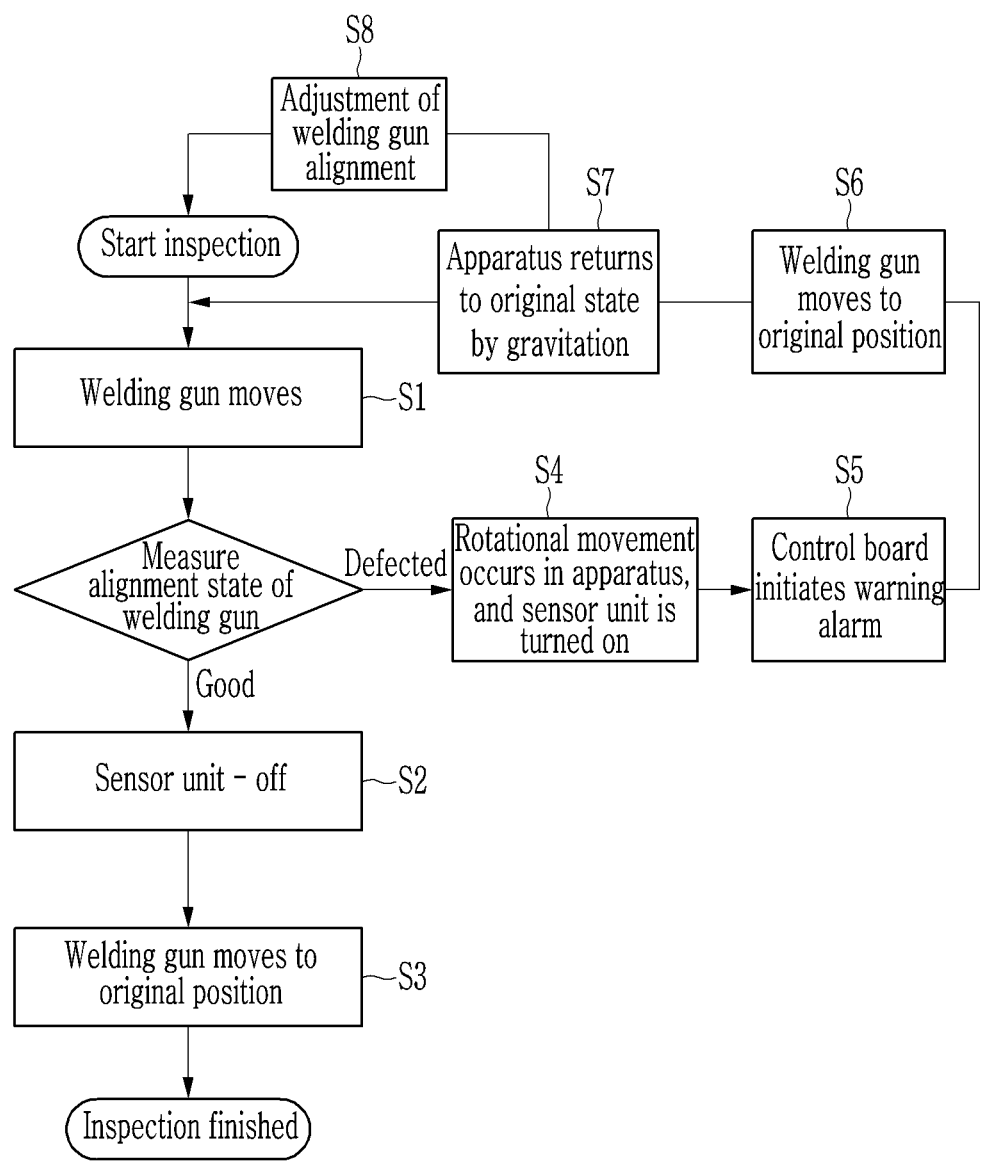
FIG. 5 is an operation flowchart of an apparatus for measuring alignment of a welding gun according to an exemplary embodiment.

FIG. 5 is an operation flowchart of the apparatus 1 for measuring alignment of a welding gun according to an exemplary embodiment.

Referring to FIG. 5, at step S1, the apparatus 1 for measuring alignment of a welding gun moves to the welding gun to be measured.

When the welding gun is in the normal state (well aligned), the rotational movement of the upper block 30 and the lower block 50 of the apparatus 1 for measuring alignment of a welding gun does not occur at step S2.

Then at step S3, the welding gun is returned to the original position.

When the welding gun is misalignment, the rotational movement occurs in the upper block 30 and/or the lower block 50 of the apparatus 1 for measuring alignment of the welding gun at step S4.

At this time, at step S5, the control board 70 outputs an alarm signal to the alarm 80.

Then at step S6, the welding gun is returned to the original position.

Then at step S7, the apparatus 1 for measuring alignment of the welding gun returns to its original state by the gravitational effect of the upper weight 37 or the lower weight 57.

Then at step S8, re-inspection is performed after the alignment of the upper tip 3 and the lower tip 5 of the welding gun is adjusted.

Therefore, according to the apparatus 1 for measuring alignment of the welding gun according to an exemplary embodiment, it is possible to prevent defects in the exterior quality of the finished vehicle caused by defective alignment of the welding gun.

In addition, according to the apparatus 1 for measuring alignment of the welding gun according to an exemplary embodiment, high efficiency may be realized at low cost in comparison with compared to conventional art, thereby providing advantages in applying to vehicle body mass production factories.

In addition, according to the apparatus 1 for measuring alignment of the welding gun according to an exemplary embodiment, simultaneous alignment inspection of the upper tip 3 and the lower tip 5 is available, thereby reducing the inspection period.

In addition, according to the apparatus 1 for measuring alignment of the welding gun according to an exemplary embodiment, due to the employing of the case 10, durability is improved by removing the possibility of damage by foreign matters.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for measuring alignment of a welding gun, the apparatus comprising:
    a case comprising:
        an interior space; and
        an open side;
    a supporting member mounted to the interior space;
    an upper block comprising a first end portion fixed to the supporting member, formed with an upper tip insertion hole at a second end portion, hinge-engaged with an upper pin mounted to opposing surfaces of the case, and configured to rotate according to an alignment state of an upper tip;
    an upper sensor unit mounted adjacent to the upper block and configured to detect rotation of the upper block;
    a lower block having a first end portion fixed to the supporting member, formed with a lower tip insertion hole at a second end portion, hinge-engaged with a lower pin mounted to opposing surfaces of the case, and configured to rotate according to an alignment state of a lower tip; and
    a lower sensor unit mounted adjacent to the lower block and configured to detect rotation of the lower block.

2. The apparatus of claim 1, wherein the case is detachably attached to a gripper by a connection bracket.

3. The apparatus of claim 1, wherein:
    the supporting member is vertically disposed in the interior space of the case; and
    the supporting member comprises a flange protruding along an upper surface of the case and fixed to the upper surface of the case.

4. The apparatus of claim 1, wherein the supporting member is configured to penetrate a lower surface of the case and is fixed to a stand.

5. The apparatus of claim 1, wherein the upper block comprises:
    an upper stopper having a first end portion mounted to the supporting member, and a second end portion formed integral to the first end portion and protruding upward;

an upper weight vertically disposed to correspond to the second end portion of the upper stopper; and an upper measurement portion having a first end portion fixed to the upper weight, formed with the upper tip insertion hole at a second end portion, having a central portion hinge-engaged with the upper pin and horizontally disposed, and exposing the upper tip insertion hole through the open side of the case.

6. The apparatus of claim 5, wherein the upper sensor unit is positioned on a same axis with the upper weight, and mounted to the case to correspond to an upper detection portion protruding from the upper measurement portion.

7. The apparatus of claim 6, wherein, in the upper block, when the upper tip is misaligned and is not inserted into the upper tip insertion hole:
   the upper measurement portion is configured to rotate around the upper pin; and
   the upper sensor unit is configured to sense the upper detection portion.

8. The apparatus of claim 1, wherein the lower block comprises:
   a lower stopper having a first end portion mounted to the supporting member, and a second end portion formed integral to the first end portion and protruding upward;
   a lower weight vertically disposed to correspond to the second end portion of the lower stopper; and
   a lower measurement portion having a central portion connected to the lower weight and horizontally disposed, having a first end portion hinge-engaged with the lower pin, formed with the lower tip insertion hole at a second end portion, and exposing the lower tip insertion hole through the open side of the case.

9. The apparatus of claim 8, wherein the lower sensor unit is mounted to the lower stopper to correspond to a lower detection portion protruding toward the lower stopper from the first end portion of the lower measurement portion adjacent to the lower pin.

10. The apparatus of claim 9, wherein, in the lower block, when the lower tip is misaligned and is not inserted into the lower tip insertion hole:
    the lower measurement portion is configured to rotate around the lower pin; and
    the lower sensor unit is configured to sense the lower detection portion.

11. The apparatus of claim 1, further comprising a control board to which the upper sensor unit and the lower sensor unit are connected.

12. The apparatus of claim 11, further comprising an alarm connected to the control board and configured to output a signal for a misalignment state of the upper tip and the lower tip.

* * * * *